(12) United States Patent
Togashi

(10) Patent No.: US 7,660,100 B2
(45) Date of Patent: Feb. 9, 2010

(54) THROUGH-TYPE MULTILAYER CAPACITOR ARRAY

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/339,519

(22) Filed: Dec. 19, 2008

(65) Prior Publication Data

US 2009/0168298 A1 Jul. 2, 2009

(30) Foreign Application Priority Data

Dec. 28, 2007 (JP) ............... P2007-340442

(51) Int. Cl.
*H01G 4/228* (2006.01)
(52) U.S. Cl. ............... 361/306.3; 361/306.1; 361/301.2; 361/321.1; 361/321.2; 361/308.1
(58) Field of Classification Search ............... 361/306.3, 361/306.1, 306.2, 301.2, 301.4, 311–313, 361/307, 308.1, 321.1, 321.2
See application file for complete search history.

(56) References Cited

U.S. PATENT DOCUMENTS

| | | | | |
|---|---|---|---|---|
| 6,266,228 B1 * | 7/2001 | Naito et al. | ............... | 361/306.1 |
| 6,532,143 B2 * | 3/2003 | Figueroa et al. | ............ | 361/301.4 |
| 6,768,630 B2 | 7/2004 | Togashi | | |
| 6,819,543 B2 * | 11/2004 | Vieweg et al. | ............ | 361/306.3 |
| 6,934,145 B2 * | 8/2005 | Hsieh et al. | ............... | 361/321.2 |
| 6,940,710 B1 * | 9/2005 | Lee et al. | ................. | 361/321.2 |
| 7,113,057 B2 | 9/2006 | Togashi | | |
| 7,145,429 B1 | 12/2006 | Togashi et al. | | |
| 7,411,776 B2 * | 8/2008 | Aoki | ........................ | 361/306.3 |
| 7,433,172 B2 | 10/2008 | Togashi | | |
| 7,593,214 B2 * | 9/2009 | Lee | .......................... | 361/301.4 |
| 7,595,973 B1 * | 9/2009 | Lee et al. | ................. | 361/306.3 |

FOREIGN PATENT DOCUMENTS

| | | |
|---|---|---|
| JP | A-9-93069 | 4/1997 |
| JP | A-2000-58382 | 2/2000 |
| JP | A-2004-14961 | 1/2004 |
| JP | A-2005-79756 | 3/2005 |
| JP | A-2006-253419 | 9/2006 |
| JP | A-2007-201467 | 8/2007 |

* cited by examiner

*Primary Examiner*—Nguyen T Ha
(74) *Attorney, Agent, or Firm*—Oliff & Berridge, PLC

(57) ABSTRACT

A through-type multilayer capacitor array comprises a capacitor body, and two first signal terminal electrodes, two second signal terminal electrodes, two grounding terminal electrodes, a first outer connecting conductor, and a second outer connecting conductor. The capacitor body includes a grounding inner electrode, and first to fourth signal inner electrodes. The grounding inner electrode is arranged to oppose the first or second signal inner electrode with an insulator layer in between and oppose the third or fourth signal inner electrode with an insulator layer in between while being connected to the grounding terminal electrodes. The first signal inner electrode is connected to the first signal terminal electrodes and first outer connecting conductor. The third signal inner electrode is connected to the second signal terminal electrodes and the second outer connecting conductor. The second and fourth signal inner electrodes are respectively connected to the first and second outer connecting conductor.

4 Claims, 6 Drawing Sheets

THROUGH-TYPE MULTILAYER CAPACITOR ARRAY

BACKGROUND OF THE INVENTION

1. Field of the Invention

The present invention relates to a through-type multilayer capacitor array.

2. Related Background Art

Known as this kind of multilayer capacitor is one comprising a multilayer body constituted by a plurality of dielectric layers; input, output, and ground electrodes which are provided on outer surfaces of the multilayer body; a resistor connected between the input and output electrodes; a first conductor electrode in which one of separated parts is connected to the input electrode while the other is connected to the output electrode; and a second conductor electrode connected to the ground electrode; wherein a capacitance is generated between the first and second conductor electrodes (see, for example, Japanese Patent Application Laid-Open No. 2000-58382). The multilayer capacitor described in Japanese Patent Application Laid-Open No. 2000-58382, which is a so-called CR filter, adjusts the resistance value of the resistor by changing the compounding ratio of a dielectric powder in a resistance paste for forming the resistor.

SUMMARY OF THE INVENTION

When including a resistor and adjusting its resistance value by changing the compounding ratio of a dielectric powder in a resistance paste as in the multilayer capacitor described in Japanese Patent Application Laid-Open No. 2000-58382, however, the resistance value of resistance components in the CR filter is very hard to manage accurately. In particular, it is difficult for the multilayer capacitor described in Japanese Patent Application Laid-Open No. 2000-58382 to set the resistance value of resistance components higher.

It is an object of the present invention to provide a through-type multilayer capacitor array which can accurately manage the resistance value of resistance components.

The through-type multilayer capacitor in accordance with the present invention comprises a capacitor body, at least two first signal terminal electrodes arranged on an outer surface of the capacitor body, at least two second signal terminal electrodes arranged on the outer surface of the capacitor body, at least two grounding terminal electrodes arranged on the outer surface of the capacitor body, at least one first outer connecting conductor arranged on the outer surface of the capacitor body, and at least one second outer connecting conductor arranged on the outer surface of the capacitor body; wherein the capacitor body includes a plurality of laminated insulator layers, a grounding inner electrode, a first signal inner electrode, a second signal inner electrode, a third signal inner electrode, and a fourth signal inner electrode; wherein the grounding inner electrode is arranged such as to oppose the first or second signal inner electrode with at least one of the plurality of insulator layers in between and oppose the third or fourth signal inner electrode with at least one of the plurality of insulator layers in between while being connected to the at least two grounding terminal electrodes; wherein the first signal inner electrode is connected to the at least two first signal terminal electrodes and the at least one first outer connecting conductor; wherein the second signal inner electrode is connected to the at least one first outer connecting conductor, wherein the third signal inner electrode is connected to the at least two second signal terminal electrodes and the at least one second outer connecting conductor; and wherein the fourth signal inner electrode is connected to the at least one second outer connecting conductor.

In the through-type multilayer capacitor array in accordance with the present invention, the signal inner electrodes include the first signal inner electrode connected to the first signal terminal electrodes, the third signal inner electrode connected to the second signal terminal electrodes, the second signal inner electrode indirectly connected to the first signal terminal electrodes through the first outer connecting conductor, and the fourth signal inner electrode indirectly connected to the second signal terminal electrodes through the second outer connecting conductor.

If all the signal inner electrodes are connected to the signal terminal electrodes, the respective resistance components formed by the signal inner electrodes in each capacitor will be connected in parallel to the signal terminal electrodes, thus lowering the combined resistance value of the resistance components formed by the signal inner electrodes. If the number of laminations of insulator layers and inner electrodes is increased in order to set a greater capacitance in each of the capacitors included in the through-type multilayer capacitor array, the combined resistance value will decrease further.

The inventors conducted diligent studies about a through-type multilayer capacitor array which can accurately manage the resistance value of resistance components. As a result, the inventors have found a new fact that the combined resistance value of resistance components formed by signal inner electrodes can be set to a desirable value if the number of signal inner electrodes connected to the signal terminal electrodes can be changed while the signal inner electrodes are connected with outer connecting conductors arranged on an outer surface of the capacitor body in each of the capacitors included in the through-type multilayer capacitor array. The inventors have also found a new fact that the combined resistance value of resistance components formed by signal inner electrodes can similarly be set to a desirable value if the position of signal inner electrodes connected to the signal terminal electrodes can be changed while the signal inner electrodes are connected with outer connecting conductors arranged on an outer surface of the capacitor body in each of the capacitors included in the through-type multilayer capacitor array. In particular, the combined resistance value can be adjusted so as to become greater if the number of signal inner electrodes connected to the signal terminal electrodes is made smaller than the total number of the signal inner electrodes, i.e., there is a signal inner electrode indirectly connected to the signal terminal electrodes through the outer connecting conductor, in each of the capacitors included in the through-type multilayer capacitor array.

In view of the foregoing, the present invention makes it possible to accurately manage the resistance value of each resistance component in each of the capacitors included in the through-type multilayer capacitor array. In particular, the present invention makes it possible to set the capacitance greater in each capacitor while setting a greater resistance value in resistance components of a CR filter.

In this case, the at least two first signal terminal electrodes may be arranged at least one by one on a pair of opposing side faces of the capacitor body, the at least two second signal terminal electrodes may be arranged at least one by one on the pair of opposing side faces of the capacitor body, and the at least two grounding signal terminal electrodes may be arranged at least one by one on a pair of opposing side faces of the capacitor body.

Preferably, the first and third signal inner electrodes are arranged at the same position in the laminating direction of the insulator layers within the capacitor body, while the second and fourth signal inner electrodes are arranged at the same position in the laminating direction of the insulator layers within the capacitor body. This allows the through-type multilayer capacitor array to lower its profile.

Both or one of the first and third signal inner electrodes may have a meander form. This can elongate a current path, whereby the resistance value of the resistance component in a capacitor including the first signal inner electrode can further be increased.

The present invention can provide a through-type multilayer capacitor array which can accurately manage the resistance value of resistance components.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
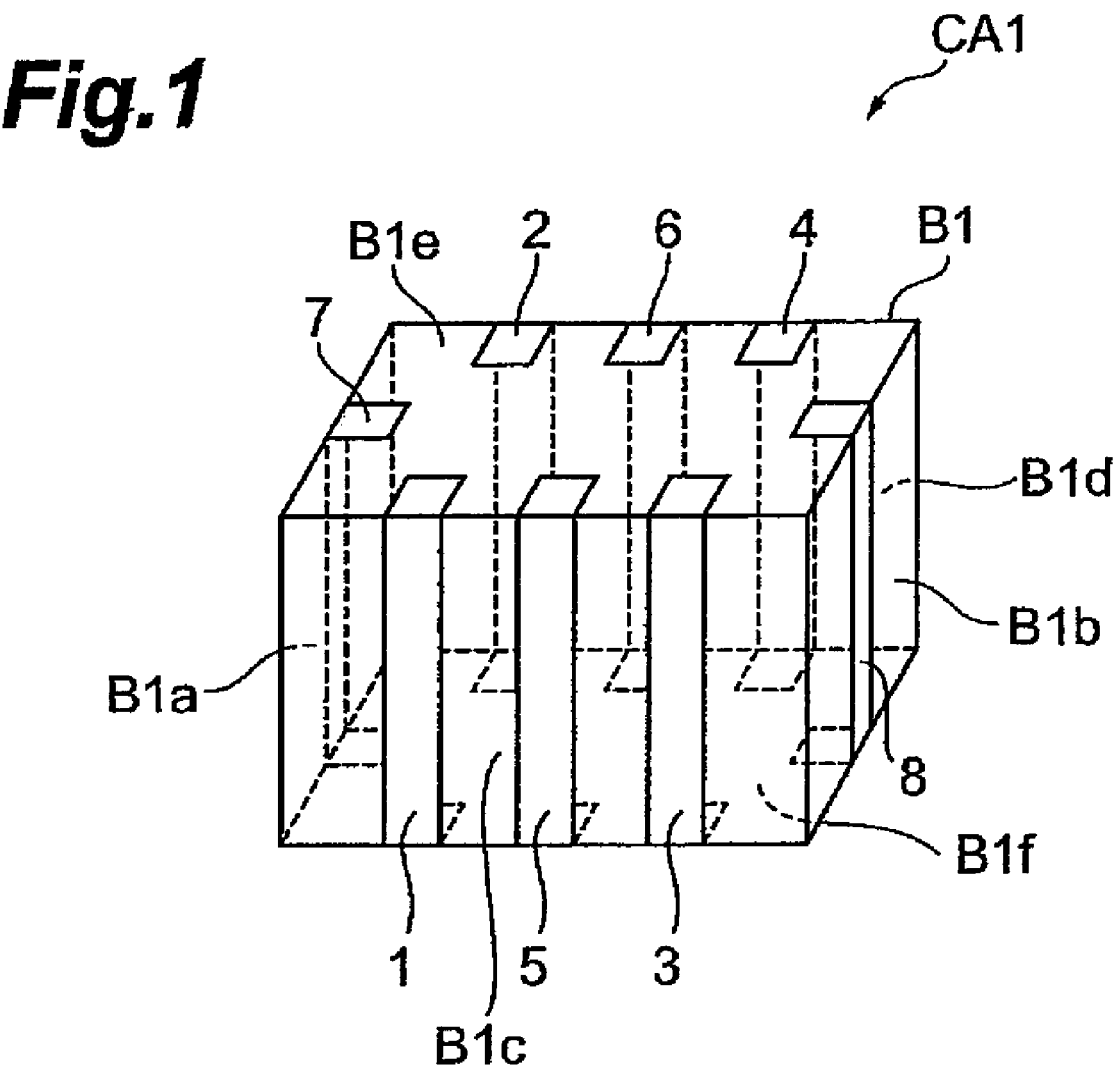
FIG. 1 is a perspective view of the through-type multilayer capacitor array in accordance with a first embodiment.

In the following, preferred embodiments will be explained in detail with reference to the accompanying drawings. In the explanation, the same constituents or those having the same functions will be referred to with the same reference characters while omitting their overlapping descriptions.

First Embodiment

Figure 2:
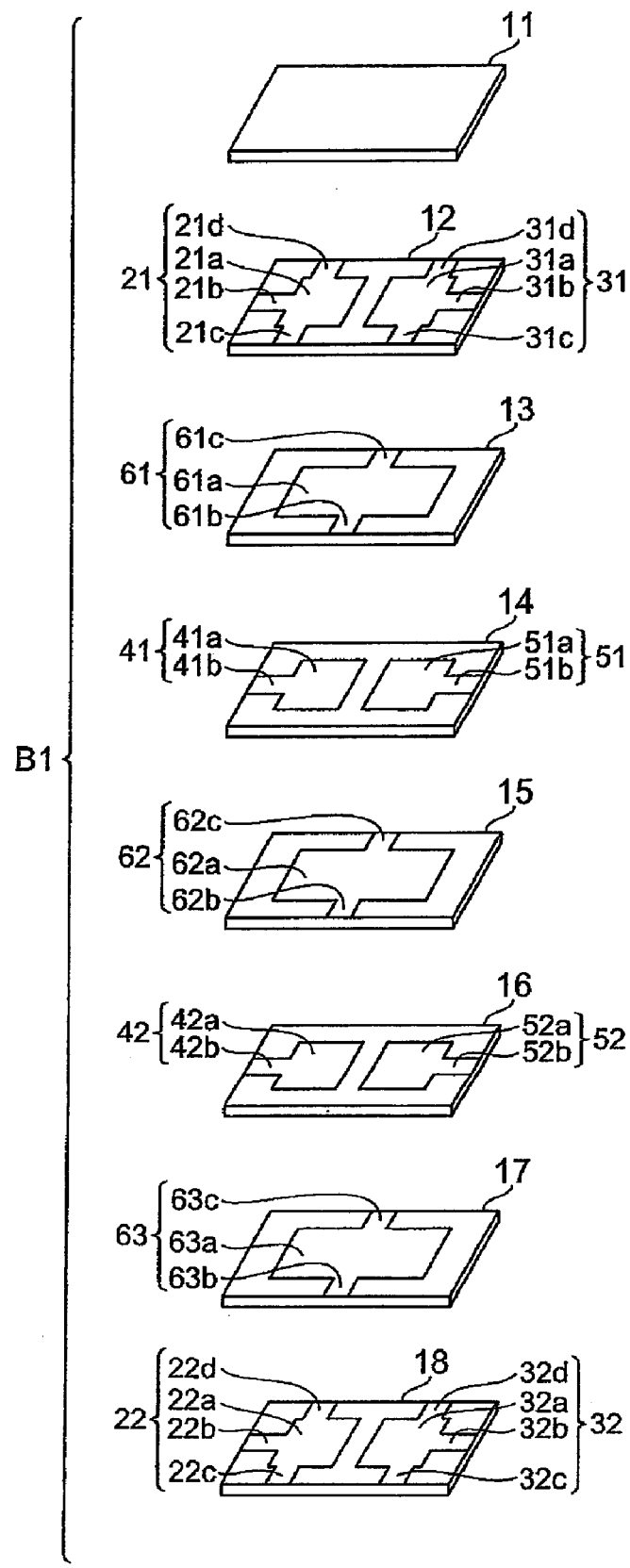
FIG. 2 is an exploded perspective view of a capacitor body included in the through-type multilayer capacitor array in accordance with the first embodiment.

The structure of the through-type multilayer capacitor array CA1 in accordance with the first embodiment will now be explained with reference to FIGS. 1 and 2. FIG. 1 is a perspective view of the through-type multilayer capacitor array in accordance with the first embodiment. FIG. 2 is an exploded perspective view of a capacitor body included in the through-type multilayer capacitor array in accordance with the first embodiment.

As shown in FIG. 1, the through-type multilayer capacitor array CA1 in accordance with the first embodiment comprises a capacitor body B1, and first signal terminal electrodes 1, 2, second signal terminal electrodes 3, 4, grounding terminal electrodes 5, 6, a first outer connecting conductor 7, and a second outer connecting conductor 8 which are arranged on outer surfaces of the capacitor body B1. The through-type multilayer capacitor array CA1 can be used as a noise filter for preventing noises from leaking or entering through leads for signals and the like, for example.

The first and second signal terminal electrodes 1 to 4, grounding terminal electrodes 5, 6, and first and second outer connecting conductors 7, 8 are formed by applying and burning a conductive paste containing a conductive metal powder and glass frit onto their corresponding outer surfaces of the capacitor body, for example. Plating layers may be formed on the burned terminal electrodes and outer connecting conductors when necessary. The first and second signal terminal electrodes 1 to 4, grounding terminal electrodes 5, 6, and first and second outer connecting conductors 7, 8 are formed such as to be electrically insulated from each other on the surfaces of the capacitor body B1.

As shown in FIG. 1, the capacitor body B1 is shaped like a rectangular parallelepiped and has oblong first and second main faces B1$e$, B1$f$ opposing each other, first and second end faces B1$a$, B1$b$ extending in the shorter side direction of the first and second main faces B1$e$, B1$f$ so as to connect them to each other while opposing each other, and first and second side faces B1$c$, B1$d$ extending in the longer side direction of the first and second main faces B1$e$, B1$f$ so as to connect them to each other while opposing each other.

The first signal terminal electrodes 1, 2 are arranged one by one on the opposing first and second side faces B1$c$, B1$d$ of the capacitor body B1. The first signal terminal electrode 1 is arranged on the first side face B1$c$ of the capacitor body B1. On the other hand, the first signal terminal electrode 2 is arranged on the second side face B1$d$ of the capacitor body B1 opposing the first side face B1$c$. The first signal terminal electrodes 1, 2 oppose each other in the opposing direction of the first and second side faces B1$c$, B1$d$.

The second signal terminal electrodes 3, 4 are arranged one by one on the opposing first and second side faces B1$c$, B1$d$ of the capacitor body B1. The second signal terminal electrode 3 is arranged on the first side face B1$c$ of the capacitor body B1. On the other hand, the second signal terminal electrode 4 is arranged on the second side face B1$d$ of the capacitor body B1 opposing the first side face B1$c$. The second signal terminal electrodes 3, 4 oppose each other in the opposing direction of the first and second side faces B1$c$, B1$d$.

The grounding terminal electrodes 5, 6 are arranged one by one on the opposing first and second side faces B1$c$, B1$d$ of the capacitor body B1. The grounding terminal electrode 5 is arranged on the first side face B1$c$ of the capacitor body B1. On the other hand, the grounding terminal electrode 6 is arranged on the second side face B1$d$ of the capacitor body B1 opposing the first side face B1$c$. The grounding terminal electrodes 5, 6 oppose each other in the opposing direction of the first and second side faces B1$c$, B1$d$.

The first and second signal terminal electrodes 1, 3 and grounding terminal electrode 5 are arranged on the first side face B1$c$ of the capacitor body B1 in the order of the first signal terminal electrode 1, grounding terminal electrode 5, and second signal terminal electrode 3 in the direction from the first end face B1$a$ to the second end face B1$b$. The first and second signal terminal electrodes 2, 4 and grounding terminal electrode 6 are arranged on the second side face B1$d$ of the capacitor body B1 in the order of the first signal terminal electrode 2, grounding terminal electrode 6, and second signal terminal electrode 4 in the direction from the first end face B1a to the second end face B1b.

The first outer connecting conductor 7 is arranged on the first end face B1a of the capacitor body B1. The second outer connecting conductor 8 is arranged on the second end face B1b of the capacitor body B1.

As shown in FIG. 2, the capacitor body B1 is constructed by laminating a plurality of (8 in this embodiment) insulator layers 11 to 18. Each of the insulator layers 11 to 18 is constituted by a sintered body of a ceramic green sheet containing a dielectric ceramic, for example. The laminating direction of the insulator layers 11 to 18 in the capacitor body B1 will simply be referred to as "laminating direction" in the following. In the actual multilayer capacitor array CA1, the insulator layers 11 to 18 are integrated to such an extent that their boundaries are indiscernible.

The capacitor body B1 includes therewithin first signal inner electrodes 21, 22, second signal inner electrodes 41, 42, third signal inner electrodes 31, 32, fourth signal inner electrodes 51, 52, and grounding inner electrodes 61 to 63.

The first to fourth signal inner electrodes 21, 22, 41, 42, 31, 32, 51, 52 include rectangular main electrode parts 21a, 22a, 41a, 42a, 31a, 32a, 51a, 52a, respectively. The main electrode parts 21a, 22a, 41a, 42a, 31a, 32a, 51a, 52a are arranged such that their sides are parallel to the longer or shorter side direction of the first and second main faces B1e, B1f of the capacitor body B1.

The first signal inner electrodes 21, 22 further include lead parts 21b, 22b extending from the main electrode parts 21a, 22a to the first end face B1a, lead parts 21c, 22c extending from the main electrode parts 21a, 22a to the first side face B1c, and lead parts 21d, 22d extending from the main electrode parts 21a, 22a to the second side face B1d. Each of the lead parts 21b, 22b is connected to the first outer connecting conductor 7. Each of the lead parts 21c, 22c is connected to the first signal terminal electrode 1. Each of the lead parts 21d, 22d is connected to the first signal terminal electrode 2. Hence, each of the first signal inner electrodes 21, 22 is connected to two first signal terminal electrodes 1, 2 and one first outer connecting conductor 7.

The second signal inner electrodes 41, 42 further include lead parts 41b, 42b extending from the main electrode parts 41a, 42a to the first end face B1a. Each of the lead parts 41b, 42b is connected to the first outer connecting conductor 7. Hence, each of the second signal inner electrodes 41, 42 is connected to one first outer connecting conductor 7.

The third signal inner electrodes 31, 32 further include lead parts 31b, 32b extending from the main electrode parts 31a, 32a to the second end face B1b, lead parts 31c, 32c extending from the main electrode parts 31a, 32a to the first side face B1c, and lead parts 31d, 32d extending from the main electrode parts 31a, 32a to the second side face B1d. Each of the lead parts 31b, 32b is connected to the second outer connecting conductor 8. Each of the lead parts 31c, 32c is connected to the second signal terminal electrode 3. Each of the lead parts 31d, 32d is connected to the second signal terminal electrode 4. Hence, each of the third signal inner electrodes 31, 32 is connected to two second signal terminal electrodes 3, 4 and one second outer connecting conductor 8.

The fourth signal inner electrodes 51, 52 further include lead parts 51b, 52b extending from the main electrode parts 51a, 52a to the second end face B1b. Each of the lead parts 51b, 52b is connected to the second outer connecting conductor 8. Hence, each of the fourth signal inner electrodes 51, 52 is connected to one second outer connecting conductor 8.

The grounding inner electrodes 61 to 63 include rectangular main electrode parts 61a to 63a, respectively. The main electrode parts 61a to 63a are arranged such that their sides are parallel to the longer or shorter side direction of the first and second main faces B1e, B1f of the capacitor body B1.

The grounding inner electrodes 61 to 63 further include lead parts 61b to 63b extending from the main electrode parts 61a to 63a to the first side face B1c and lead parts 61c to 61c extending from the main electrode parts 61a to 63a to the second side face B1d. Each of the lead parts 61b to 63b is connected to the grounding terminal electrode 5. Each of the lead parts 61c to 63c is connected to the grounding terminal electrode 6. Hence, each of the grounding inner electrodes 61 to 63 is connected to two grounding terminal electrodes 5, 6.

The first and third signal inner electrodes 21, 31 are arranged at the same position in the laminating direction within the capacitor body B1. The first and third signal inner electrodes 22, 32 are arranged at the same position in the laminating direction within the capacitor body B1. The second and fourth signal inner electrodes 41, 51 are arranged at the same position in the laminating direction within the capacitor body B1. The second and fourth signal inner electrodes 42, 52 are arranged at the same position in the laminating direction within the capacitor body B1.

The grounding inner electrode 61 to 63 are arranged such as to oppose the first or second signal inner electrode 21, 22, 41, 42 through at least one of the plurality of insulator layers 11 to 18 and oppose the third or fourth signal inner electrode 31, 32, 51, 52 through at least one of the plurality of insulator layers 11 to 18.

Specifically, the main electrode part 61a of the grounding inner electrode 61 opposes both of the main electrode part 21a of the first signal inner electrode 21 and the main electrode part 31a of the third signal inner electrode 31 through the insulator layer 12. The main electrode part 61a of the grounding inner electrode 61 also opposes both of the main electrode part 41a of the second signal inner electrode 41 and the main electrode part 51a of the fourth signal inner electrode 51 through the insulator layer 13.

The main electrode part 62a of the grounding inner electrode 62 opposes both of the main electrode part 41a of the second signal inner electrode 41 and the main electrode part 51a of the fourth signal inner electrode 51 through the insulator layer 14. The main electrode part 62a of the grounding inner electrode 62 also opposes both of the main electrode part 42a of the second signal inner electrode 42 and the main electrode part 52a of the fourth signal inner electrode 52 through the insulator layer 15.

The main electrode part 63a of the grounding inner electrode 63 opposes both of the main electrode part 42a of the second signal inner electrode 42 and the main electrode part 52a of the fourth signal inner electrode 52 through the insulator layer 16. The main electrode part 63a of the grounding inner electrode 63 opposes both of the main electrode part 22a of the first signal inner electrode 22 and the main electrode part 32a of the third signal inner electrode 32 through the insulator layer 17.

Each of the first signal inner electrodes 21, 22 is arranged on the first end face B1a side of the capacitor body B1. Each of the third signal inner electrodes 31, 32 is arranged on the second end face B1b side of the capacitor body B1. The first and third signal inner electrodes 21, 22; 31, 32 are arranged in pairs aligning in the opposing direction of the first and second end faces B1a, B1b, while having no overlapping areas therebetween in the laminating direction.

Each of the second signal inner electrodes 41, 42 is arranged on the first end face B1a side of the capacitor body B1. Each of the fourth signal inner electrodes 51, 52 is arranged on the second end face B1b side of the capacitor body B1. The second and fourth signal inner electrodes 41, 42; 51, 52 are arranged in pairs aligning in the opposing direction of the first and second end faces B1a, B1b, while having no overlapping areas therebetween in the laminating direction.

The main electrode parts 41a, 42a of the second signal inner electrodes 41, 42 oppose their corresponding main electrode parts 61a to 63a of the grounding inner electrodes 61 to 63 through the insulator layers 13 to 16. This forms a capacity component having a predetermined capacitance. In this embodiment, the main electrode part 21a of the first signal inner electrode 21 and the main electrode part 61a of the grounding inner electrode 61 oppose each other through the insulator layer 12, while the main electrode part 22a of the first signal inner electrode 22 and the main electrode part 63a of the grounding inner electrode 63 oppose each other through the insulator layer 17, whereby a capacity component is formed.

The main electrode parts 51a, 52a of the fourth signal inner electrodes 51, 52 oppose their corresponding main electrode parts 61a to 63a of the grounding inner electrodes 61 to 63 through the insulator layers 13 to 16. This forms a capacity component having a predetermined capacitance. In this embodiment, the main electrode part 31a of the third signal inner electrode 31 and the main electrode part 61a of the grounding inner electrode 61 oppose each other through the insulator layer 12, while the main electrode part 32a of the third signal inner electrode 32 and the main electrode part 63a of the grounding inner electrode 63 oppose each other through the insulator layer 17, whereby a capacity component is formed.

Figure 3:
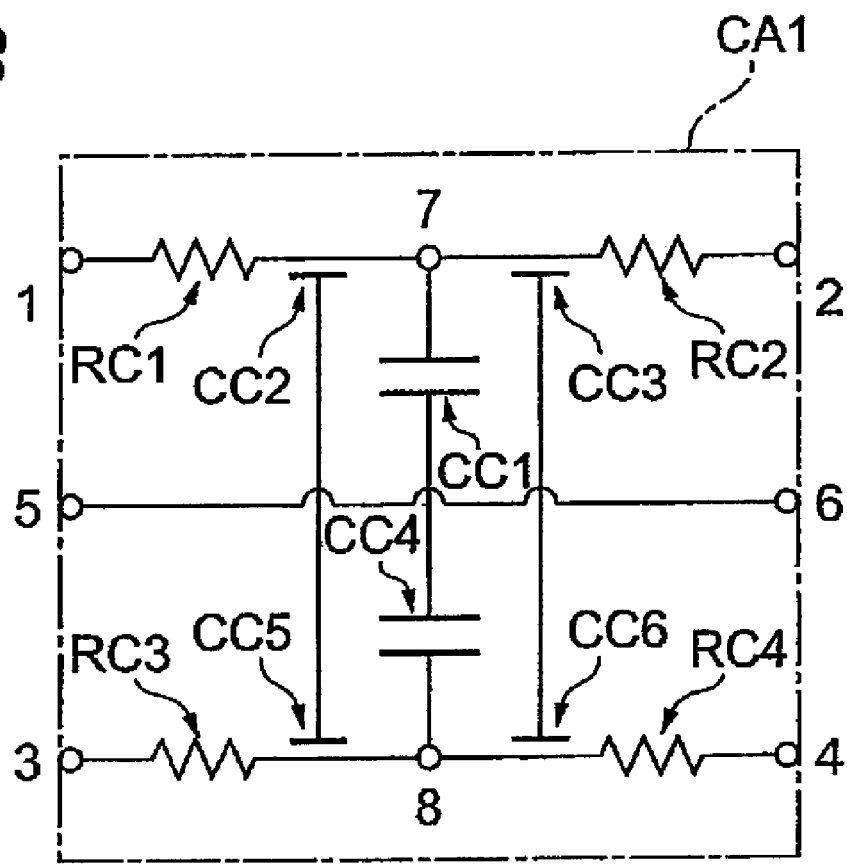
FIG. 3 is an equivalent circuit diagram of the through-type multilayer capacitor array in accordance with the first embodiment.

In thus constructed through-type multilayer capacitor array CA1, capacity components CC1 to CC4 and resistance components RC1 to RC4 are formed as shown in FIG. 3. In this case, the first and second signal terminal electrodes 1 to 4 are connected to signal leads, the grounding terminal electrodes 5, 6 are connected to grounding leads, and the outer connecting conductors 7, 8 are directly connected to none of the signal leads and grounding leads. FIG. 3 is an equivalent circuit diagram of the through-type multilayer capacitor array in accordance with this embodiment.

The capacity component CC1 is constituted by the insulator layers 13 to 16 and the second signal inner electrodes 41, 42 and grounding inner electrodes 61 to 63 opposing each other through the insulator layers 13 to 16. The capacity components CC2 and CC3 are composed of a capacity component constituted by the insulator layer 12 and the first signal inner electrode 21 and grounding inner electrode 61 opposing each other through the insulator layer 12, and a capacity component constituted by the insulator layer 17 and the first signal inner electrode 22 and grounding inner electrode 63 opposing each other through the insulator layer 17.

The resistance components RC1, RC2 are constituted by the first and second signal inner electrodes 21, 22, 41, 42 and first outer connecting conductor 7. Therefore, the resistance components RC1, RC2 are connected in series between the first signal terminal electrodes 1, 2.

The capacity component CC4 is constituted by the insulator layers 13 to 16 and the fourth signal inner electrodes 51, 52 and grounding inner electrodes 61 to 63 opposing each other through the insulator layers 13 to 16. The capacity components CC5 and CC6 are composed of a capacity component constituted by the insulator layer 12 and the third signal inner electrode 31 and grounding inner electrode 61 opposing each other through the insulator layer 12, and a capacity component constituted by the insulator layer 17 and the third signal inner electrode 32 and grounding inner electrode 63 opposing each other through the insulator layer 17.

The resistance components RC3, RC4 are constituted by the third and fourth signal inner electrodes 31, 32, 51, 52 and second outer connecting conductor 8. Therefore, the resistance components RC3, RC4 are connected in series between the second signal terminal electrodes 3, 4.

Thus, the through-type multilayer capacitor array CA1 in accordance with this embodiment has not only the capacity components CC1 to CC6 but also the resistance components RC1 to RC4. Therefore, as can also be seen from FIG. 3, the through-type multilayer capacitor array CA1 has a CR filter.

Meanwhile, the second signal inner electrodes 41, 42 are not directly connected to the first signal terminal electrodes 1, 2 in the through-type multilayer capacitor array CA1. In the through-type multilayer capacitor array CA1, only the first signal inner electrodes 21, 22 are directly connected to the first signal terminal electrodes 1, 2, while the second signal inner electrodes 41, 42 are indirectly connected to the first signal terminal electrodes 1, 2 through the first outer connecting conductor 7 and first signal inner electrodes 21, 22. Hence, in the through-type multilayer capacitor array CA1, a plurality of first and second signal inner electrodes 21, 22, 41, 42 are connected to each other trough the first outer connecting conductor 7, while at least one first signal inner electrode (two first signal inner electrodes 21, 22 in this embodiment) is connected to the first signal terminal electrodes 1, 2.

When attention is focused on the first signal terminal electrode 1 in the through-type multilayer capacitor array CA1, the resistance component of the first outer connecting conductor 7 is connected in series with the first signal terminal electrode 1. When attention is focused on the first signal terminal electrode 2, the resistance component of the first outer connecting conductor 7 is connected in series with the first signal terminal electrode 2.

These make the resistance value of the resistance components RC1, RC2 greater in the through-type multilayer capacitor array CA1 than in a through-type multilayer capacitor array having a structure in which all of the first and second signal inner electrodes 21, 22, 41, 42 are directly connected to the first signal terminal electrodes 1, 2 by the lead parts.

Changing the number of first signal inner electrodes directly connected to the first signal terminal electrodes 1, 2 alters the resistance value of the resistance components RC1, RC2 in the through-type multilayer capacitor array CA1. Changing the position of the first signal inner electrodes 21, 22 (in the laminating direction of the capacitor body B1) directly connected to the first signal terminal electrodes 1, 2 also alters the connection state (between series and parallel connections) of the resistance component of the first outer connecting conductor 7 in the through-type multilayer capacitor array CA1, whereby the resistance value of the resistance components RC1, RC2 varies.

As in the foregoing, by adjusting one or both of the number and position of the first signal inner electrodes 21, 22 directly connected to the first signal terminal electrodes 1, 2 by the lead parts 21c, 21d, 22c, 22d, this embodiment sets the resistance value of the resistance components RC1, RC2 in the through-type multilayer capacitor array CA1 to a desirable value, and thus can control the resistance value of the resistance components RC1, RC2 easily and accurately.

Even when the number of laminations of the second signal inner electrodes 41, 42 and grounding inner electrodes 61 to 63 is increased so as to attain a greater capacitance in the capacity component CC1 in response to the demand for a larger capacity, this embodiment can keep the resistance value of the resistance components RC1, RC2 from decreasing in the through-type multilayer capacitor array CA1.

The fourth signal inner electrodes 51, 52 are not directly connected to the second signal terminal electrodes 3, 4 in the through-type multilayer capacitor array CA1. In the through-type multilayer capacitor array CA1, only the third signal inner electrodes 31, 32 are directly connected to the second signal terminal electrodes 3, 4, while the fourth signal inner electrodes 51, 52 are indirectly connected to the second signal terminal electrodes 3, 4 through the second outer connecting conductor 8 and third signal inner electrodes 31, 32. Hence, in the through-type multilayer capacitor array CA1, a plurality of third and fourth signal inner electrodes 31, 32, 51, 52 are connected to each other through the second outer connecting conductor 8, while at least one third signal inner electrode (two third signal inner electrodes 31, 32 in this embodiment) is connected to the second signal terminal electrodes 3, 4.

When attention is focused on the second signal terminal electrode 3 in the through-type multilayer capacitor array CA1, the resistance component of the second outer connecting conductor 8 is connected in series with the second signal terminal electrode 3. When attention is focused on the second signal terminal electrode 4, the resistance component of the second outer connecting conductor 8 is connected in series with the second signal terminal electrode 4.

These make the resistance value of the resistance components RC3, RC4 greater in the through-type multilayer capacitor array CA1 than in a through-type multilayer capacitor array having a structure in which all of the third and fourth signal inner electrodes 31, 32, 51, 52 are directly connected to the second signal terminal electrodes 3, 4 by the lead parts.

Changing the number of second signal inner electrodes directly connected to the second signal terminal electrodes 3, 4 alters the resistance value of the resistance components RC3, RC4 in the through-type multilayer capacitor array CA1. Changing the position of the third signal inner electrodes 31, 32 (in the laminating direction of the capacitor body B1) directly connected to the second signal terminal electrodes 3, 4 also alters the connection state (between series and parallel connections) of the resistance component of the second outer connecting conductor 8 in the through-type multilayer capacitor array CA1, whereby the resistance value of the resistance components RC3, RC4 varies.

As in the foregoing, by adjusting one or both of the number and position of the third signal inner electrodes 31, 32 directly connected to the second signal terminal electrodes 3, 4 by the lead parts 31c, 31d, 32c, 32d, this embodiment sets the resistance value of the resistance components RC3, RC4 in the through-type multilayer capacitor array CA1 to a desirable value, and thus can control the resistance value of the resistance components RC3, RC4 easily and accurately.

Even when the number of laminations of the fourth signal inner electrodes 51, 52 and grounding inner electrodes 61 to 63 is increased so as to attain a greater capacitance in the capacity component CC4 in response to the demand for a larger capacity, this embodiment can keep the resistance value of the resistance components RC3, RC4 from decreasing in the through-type multilayer capacitor array CA1.

Thus, the resistance value of the resistance components RC1 to RC4 included in the through-type multilayer capacitor array CA1 in accordance with this embodiment can be controlled easily and accurately.

In this embodiment, the first signal terminal electrodes 1, 2 are arranged one by one on the opposing first and second side faces B1c, B1d of the capacitor body B1 such as to oppose each other in the opposing direction of the first and second side faces B1c, B1d. The second signal terminal electrodes 3, 4 are arranged one by one on the opposing first and second side faces B1c, B1d of the capacitor body B1 such as to oppose each other in the opposing direction of the first and second side faces B1c, B1d. The grounding terminal electrodes 5, 6 are arranged one by one on the opposing first and second side faces B1c, B1d of the capacitor body B1 such as to oppose each other in the opposing direction of the first and second side faces B1c, B1d.

For example, this makes it easy to connect the first signal terminal electrodes 1, 2 to linear signal leads, the second signal terminal electrodes 3, 4 to linear signal leads, and the grounding terminal electrodes 5, 6 to linear grounding leads, whereby the through-type multilayer capacitor array CA1 can be mounted easily.

In the through-type multilayer capacitor array CA1, the first and third signal inner electrodes 21, 31 are arranged at the same position in the laminating direction within the capacitor body B1, the first and third signal inner electrodes 22, 32 are arranged at the same position in the laminating direction within the capacitor body B1, the second and fourth signal inner electrodes 41, 51 are arranged at the same position in the laminating direction within the capacitor body B1, and the second and fourth signal inner electrodes 42, 52 are arranged at the same position in the laminating direction within the capacitor body B1.

Therefore, in the case where the first and second signal terminal electrodes 1, 4 are connected to the input side while the first and second signal terminal electrodes 2, 3 are connected to the output side, for example, causing currents to flow simultaneously through both of a signal lead connected to the first signal terminal electrodes 1, 2 and a signal lead connected to the second signal terminal electrodes 3, 4 can direct the currents opposite from each other through the respective inner electrodes arranged at the same position in the laminating direction.

Specifically, the direction of the current flowing through the first signal inner electrode 21 and the direction of the current flowing through the third signal inner electrode 31 can be made opposite from each other. The direction of the current flowing through the first signal inner electrode 22 and the direction of the current flowing through the third signal inner electrode 32 can be made opposite from each other.

As a result, magnetic fields caused by the currents flowing through these signal inner electrodes cancel each other out in the through-type multilayer capacitor array CA1 in accordance with this embodiment, whereby the equivalent series inductance can be lowered.

Since the respective pairs of first and third signal inner electrodes 21, 31; 22, 32 and second and fourth grounding inner electrodes 41, 51; 42, 52 are arranged at the same positions in the laminating direction within the capacitor body B1, the through-type multilayer capacitor array CA1 allows the device to lower its profile.

Figure 4:
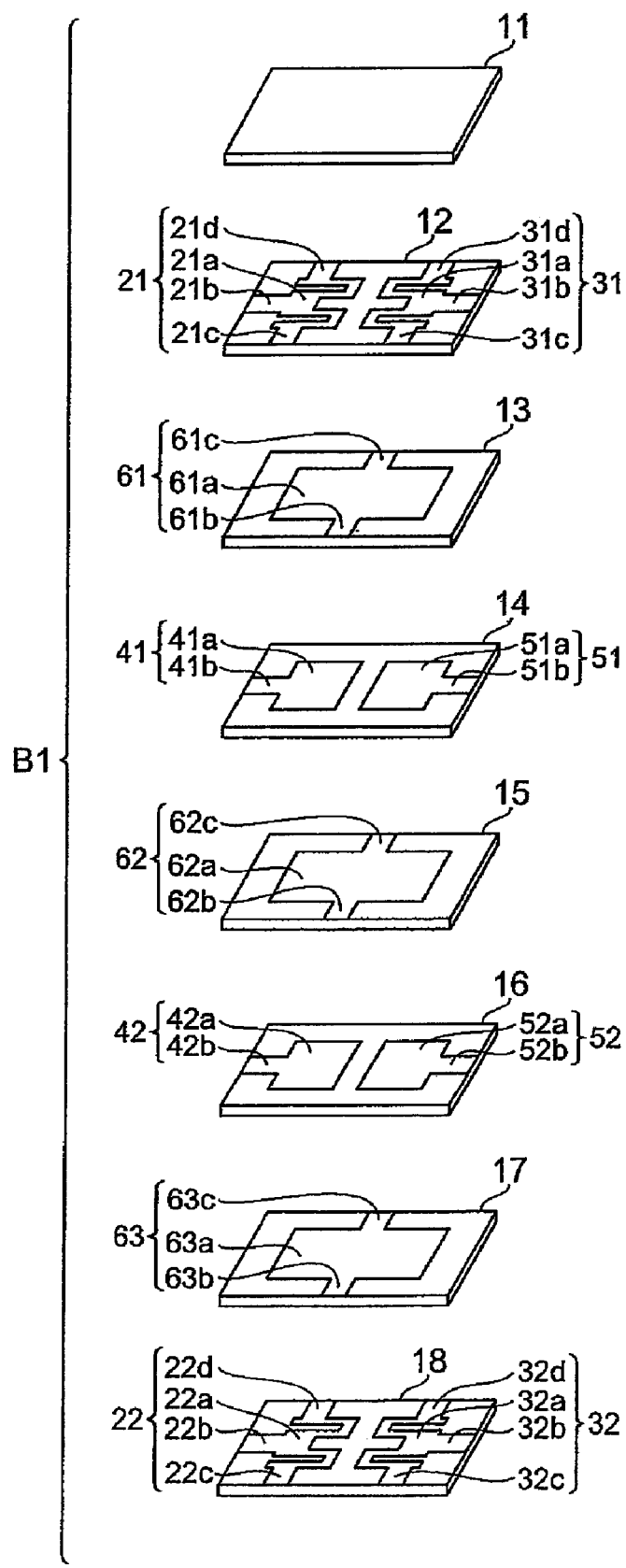
FIG. 4 is an exploded perspective view of a capacitor body included in the through-type multilayer capacitor array in accordance with a modified example of the first embodiment.

The through-type multilayer capacitor array in accordance with a modified example of this embodiment will now be explained with reference to FIG. 4. The through-type multilayer capacitor array in accordance with this modified example differs from the through-type multilayer capacitor array CA1 in accordance with the above-mentioned embodiment in terms of forms of the first and second signal inner electrodes 21, 22, 31, 32. FIG. 4 is an exploded perspective view showing the capacitor body included in the through-type multilayer capacitor array in accordance with the modified example of the embodiment.

The main electrode parts 21a, 22a, 31a, 32a of the first and third signal inner electrodes 21, 22, 31, 32 have rectangular forms and thus can increase the capacitance. Also, inner electrodes for realizing a desirable capacity component can easily be designed and manufactured.

The first and third signal inner electrodes 21, 22, 31, 32 (main electrode parts 21a, 22a, 31a, 32a) may have meander forms as shown in FIG. 4. This elongates the line length (current path) of the first and third signal inner electrodes 21, 22, 31, 32, so as to yield a relatively large resistance value, whereby the resistance value of the resistance components RC1 to RC4 can be set further greater.

Second Embodiment

Figure 5:
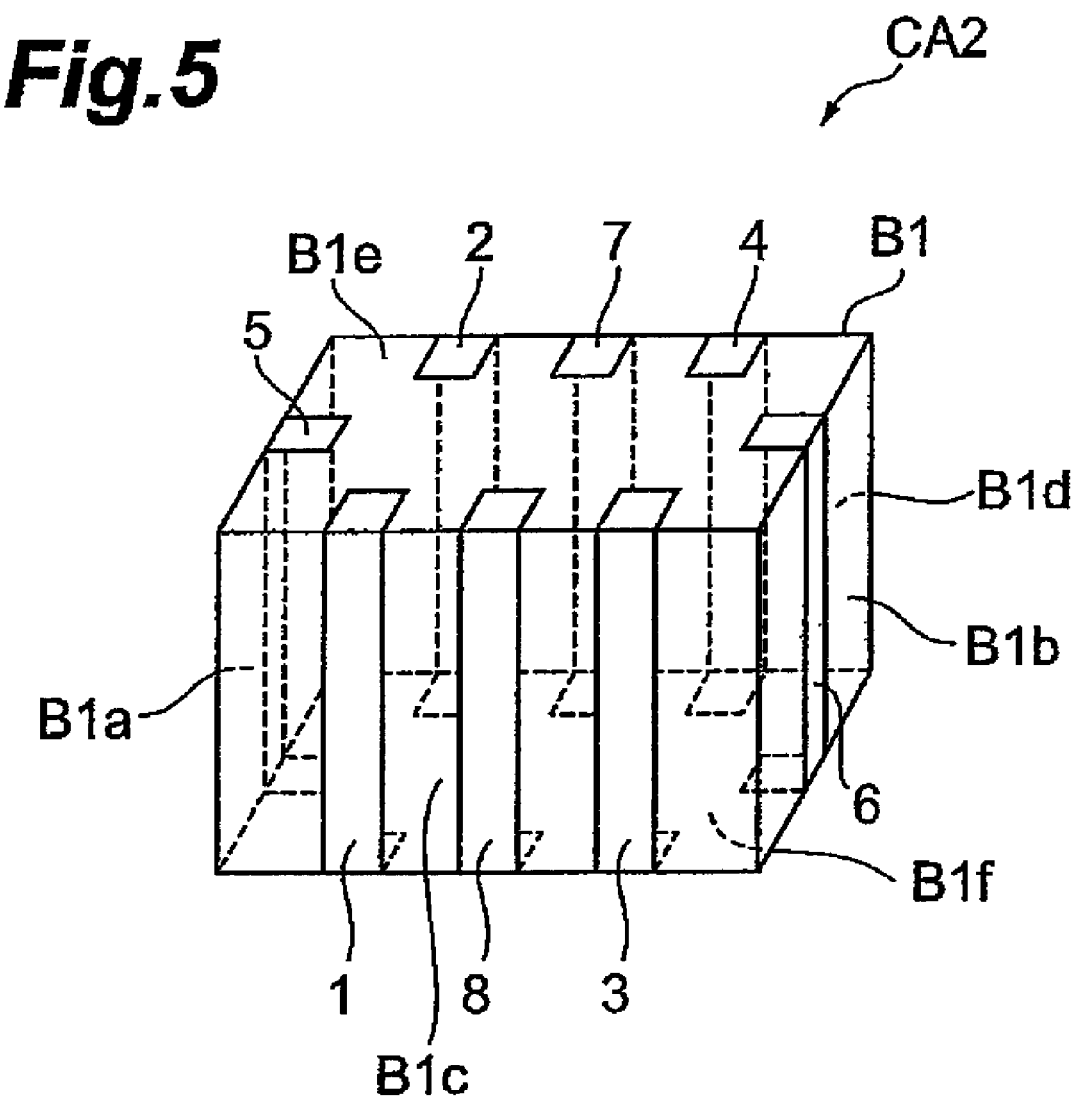
FIG. 5 is a perspective view of the through-type multilayer capacitor array in accordance with a second embodiment.
Figure 6:
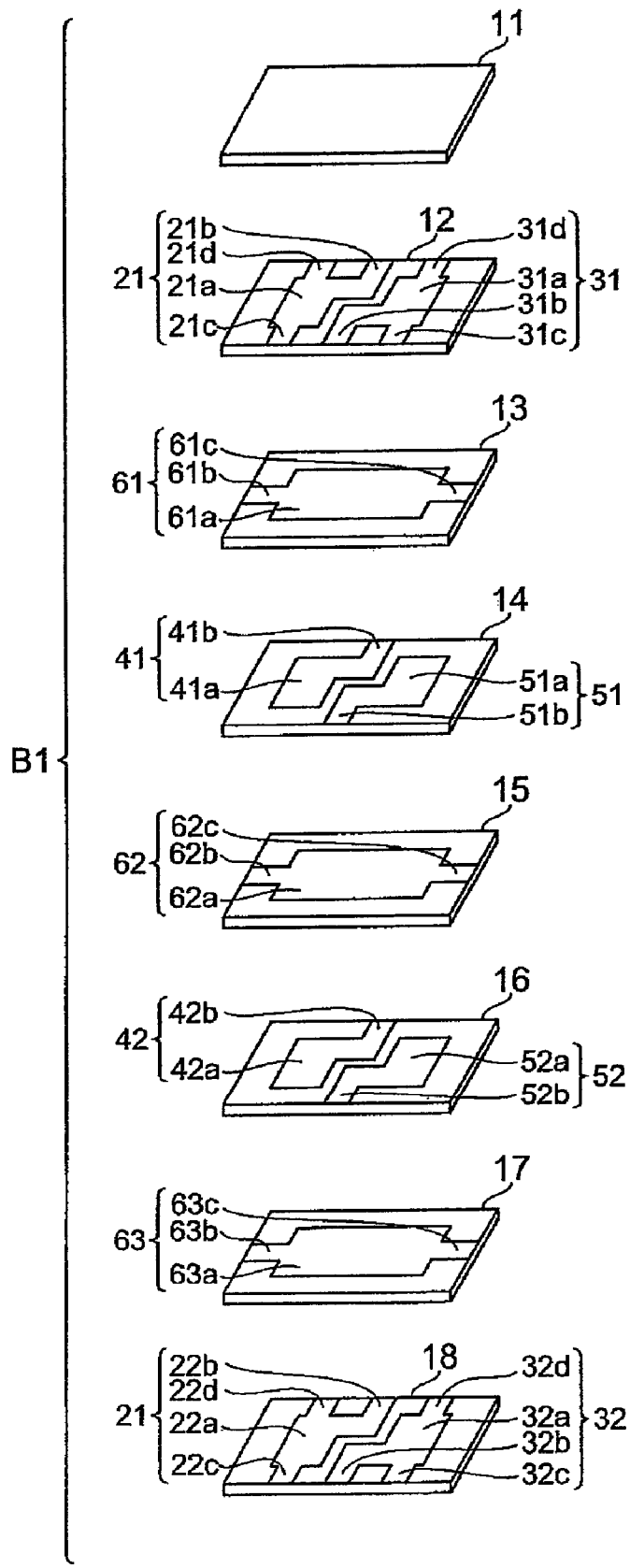
FIG. 6 is an exploded perspective view of a capacitor body included in the through-type multilayer capacitor array in accordance with the second embodiment.

The structure of the through-type multilayer capacitor array CA2 in accordance with the second embodiment will now be explained with reference to FIGS. 5 and 6. The through-type multilayer capacitor array CA2 in accordance with the second embodiment differs from the through-type multilayer capacitor array CA1 in accordance with the first embodiment in terms of the arrangement of the grounding terminal electrodes and first and second outer connecting conductors formed on the capacitor body. FIG. 5 is a perspective view of the through-type multilayer capacitor array in accordance with the second embodiment FIG. 6 is an exploded perspective view of the capacitor body included in the through-type multilayer capacitor array in accordance with the second embodiment As shown in FIG. 5, the through-type multilayer capacitor array CA2 in accordance with the second embodiment comprises a capacitor body B1, and first signal terminal electrodes 1, 2, second signal terminal electrodes 3, 4, grounding terminal electrodes 5, 6, a first outer connecting conductor 7, and a second outer connecting conductor 8 which are arranged on outer surfaces of the capacitor body B1.

The first signal terminal electrodes 1, 2 are arranged one by one on the opposing first and second side faces B1c, B1d of the capacitor body B1. The first signal terminal electrode 1 is arranged on the first side face B1c of the capacitor body B1. On the other hand, the first signal terminal electrode 2 is arranged on the second side face B1d of the capacitor body B1 opposing the first side face B1c. The first signal terminal electrodes 1, 2 oppose each other in the opposing direction of the first and second side faces B1c, B1d.

The second signal terminal electrodes 3, 4 are arranged one by one on the opposing first and second side faces B1c, B1d of the capacitor body B1. The second signal terminal electrode 3 is arranged on the first side face B1c of the capacitor body B1. On the other hand, the second signal terminal electrode 4 is arranged on the second side face B1d of the capacitor body B1 opposing the first side face B1c. The second signal terminal electrodes 3, 4 oppose each other in the opposing direction of the first and second side faces B1c, B1d.

The grounding terminal electrodes 5, 6 are arranged one by one on the opposing first and second end faces B1a, B1b of the capacitor body B1. The grounding terminal electrode 5 is arranged on the first end face B1a of the capacitor body B1. On the other hand, the grounding terminal electrode 6 is arranged on the second end face B1b of the capacitor body B1 opposing the first end face B1a. The grounding terminal electrodes 5, 6 oppose each other in the opposing direction of the first and second end faces B1a, B1b.

The first and second outer connecting conductors 7, 8 are arranged one by one on the opposing first and second side faces B1c, B1d of the capacitor body B1. The first outer connecting conductor 7 is arranged on the second side face B1d of the capacitor body B1. On the other hand, the second outer connecting conductor 8 is arranged on the first side face B1c of the capacitor body B1 opposing the second side face B1d. The first and second outer connecting conductors 7, 8 oppose each other in the opposing direction of the first and second side faces B1c, B1d.

The first and second signal terminal electrodes 1, 3 and second outer connecting conductor 8 are arranged on the first side face B1c of the capacitor body B1 in the order of the first signal terminal electrode 1, second outer connecting conductor 8, and second signal terminal electrode 3 in the direction from the first end face B1a to the second end face B1b. The first and second signal terminal electrodes 2, 4 and first outer connecting conductor 7 are arranged on the second side face B1d of the capacitor body B1 in the order of the first signal terminal electrode 2, first outer connecting conductor 7, and second signal terminal electrode 4 in the direction from the first end face B1a to the second end face B1b.

As shown in FIG. 6, the capacitor body B1 is constructed by laminating a plurality of (8 in this embodiment) insulator layers 11 to 18.

The first to fourth signal inner electrodes 21, 22, 41, 42, 31, 32, 51, 52 include main electrode parts 21a, 22a, 41a, 42a, 31a, 32a, 51a, 52a, respectively, each exhibiting a form in which two rectangles having different sizes are combined together.

Each of the main electrode parts 21a, 22a has a form in which a larger rectangle is arranged such that its longer sides are parallel to the first and second end faces B1a, B1b while a smaller rectangle is combined with the larger rectangle such as to project from the longer side on the second end face B1b side thereof toward the second end face B1b. Each of the main electrode parts 41a, 42a has a form in which a larger rectangle is arranged such that its longer sides are parallel to the first and second end faces B1a, B1b while a smaller rectangle is combined with the larger rectangle such as to project from the longer side on the second end face B1b side thereof toward the second end face B1b.

Each of the main electrode parts 31a, 32a has a form in which a larger rectangle is arranged such that its longer sides are parallel to the first and second end faces B1a, B1b while a smaller rectangle is combined with the larger rectangle such as to project from the longer side on the first end face B1a side thereof toward the first end face B1a. Each of the main electrode parts 51a, 52a has a form in which a larger rectangle is arranged such that its longer sides are parallel to the first and second end faces B1a, B1b while a smaller rectangle is combined with the larger rectangle such as to project from the longer side on the first end face B1a side thereof toward the first end face B1a.

The first signal inner electrodes 21, 22 include lead parts 21b, 22b extending from the main electrode parts 21a, 22a to the second side face B1d, lead parts 21c, 22c extending from the main electrode parts 21a, 22a to the first side face B1c, and lead parts 21d, 22d extending from the main electrode parts 21a, 22a to the second side face B1d. Each of the lead parts 21b, 22b is connected to the first outer connecting conductor 7. Each of the lead parts 21c, 22c is connected to the first signal terminal electrode 1. Each of the lead parts 21d, 22d is connected to the first signal terminal electrode 2.

The second signal inner electrodes 41, 42 include lead parts 41b, 42b extending from the main electrode parts 41a, 42a to the second side face B1d. Each of the lead parts 41b, 42b is connected to the first outer connecting conductor 7.

The third signal inner electrodes 31, 32 include lead parts 31b, 32b extending from the main electrode parts 31a, 32a to the first side face B1c, lead parts 31c, 32c extending from the main electrode parts 31a, 32a to the first side face B1c, and lead parts 31d, 32d extending from the main electrode parts 31a, 32a to the second side face B1d. Each of the lead parts 31b, 32b is connected to the second outer connecting conductor 8. Each of the lead parts 31c, 32c is connected to the second signal terminal electrode 3. Each of the lead parts 31d, 32d is connected to the second signal terminal electrode 4.

The fourth signal inner electrodes 51, 52 include lead parts 51b, 52b extending from the main electrode parts 51a, 52a to the first side face B1c. Each of the lead parts 51b, 52b is connected to the second outer connecting conductor 8.

The grounding inner electrodes 61 to 63 include lead parts 61b to 63b extending from the main electrode parts 61a to 63a to the first end face B1a and lead parts 61c to 63c extending from the main electrode parts 61a to 63a to the second end face B1b. Each of the lead parts 61b to 63b is connected to the grounding terminal electrode 5. Each of the lead parts 61c to 63c is connected to the grounding terminal electrode 6.

The first and third signal inner electrodes 21, 31 are arranged at the same position in the laminating direction within the capacitor body B1. The first and third signal inner electrodes 22, 32 are arranged at the same position in the laminating direction within the capacitor body B1. The second and fourth signal inner electrodes 41, 51 are arranged at the same position in the laminating direction within the capacitor body B1. The second and fourth signal inner electrodes 42, 52 are arranged at the same position in the laminating direction within the capacitor body B1.

The main electrode part 61a of the grounding inner electrode 61 opposes both of the main electrode part 21a of the first signal inner electrode 21 and the main electrode part 31a of the third signal inner electrode 31 through the insulator layer 12. The main electrode part 61a of the grounding inner electrode 61 also opposes both of the main electrode part 41a of the second signal inner electrode 41 and the main electrode part 51a of the fourth signal inner electrode 51 through the insulator layer 13.

The main electrode part 62a of the grounding inner electrode 62 opposes both of the main electrode part 41a of the second signal inner electrode 41 and the main electrode part 51a of the fourth signal inner electrode 51 through the insulator layer 14. The main electrode part 62a of the grounding inner electrode 62 also opposes both of the main electrode part 42a of the second signal inner electrode 42 and the main electrode part 52a of the fourth signal inner electrode 52 through the insulator layer 15.

The main electrode part 63a of the grounding inner electrode 63 opposes both of the main electrode part 42a of the second signal inner electrode 42 and the main electrode part 52a of the fourth signal inner electrode 52 through the insulator layer 16. The main electrode part 63a of the grounding inner electrode 63 also opposes both of the main electrode part 22a of the first signal inner electrode 22 and the main electrode part 32a of the third signal inner electrode 32 through the insulator layer 17.

Each of the first signal inner electrodes 21, 22 is arranged on the first end face B1a side of the capacitor body B1. Each of the third signal inner electrodes 31, 32 is arranged on the second end face B1b side of the capacitor body B1. The first and third signal inner electrodes 21, 22; 31, 32 are arranged in pairs aligning in the opposing direction of the first and second end faces B1a, B1b, while having no overlapping areas therebetween in the laminating direction.

Each of the second signal inner electrodes 41, 42 is arranged on the first end face B1a side of the capacitor body B1. Each of the fourth signal inner electrodes 51, 52 is arranged on the second end face B1b side of the capacitor body B1. The second and fourth signal inner electrodes 41, 42; 51, 52 are arranged in pairs aligning in the opposing direction of the first and second end faces B1a, B1b, while having no overlapping areas therebetween in the laminating direction.

The through-type multilayer capacitor array CA2 in accordance with this embodiment has not only the capacity components but also the resistance components as with the through-type multilayer capacitor array in accordance with the first embodiment. Therefore, the through-type multilayer capacitor array CA2 has a CR filter.

The second signal inner electrodes 41, 42 are not directly connected to the first signal terminal electrodes 1, 2 in the through-type multilayer capacitor array CA2. In the through-type multilayer capacitor array CA2, only the first signal inner electrodes 21, 22 are directly connected to the first signal terminal electrodes 1, 2, while the second signal inner electrodes 41, 42 are indirectly connected to the first signal terminal electrodes 1, 2 through the first outer connecting conductor 7 and first signal inner electrodes 21, 22. These make the resistance value of the resistance components greater in the through-type multilayer capacitor array CA2 than in a through-type multilayer capacitor array having a structure in which all of the first and second signal inner electrodes 21, 22, 41, 42 are directly connected to the first signal terminal electrodes 1, 2 by the lead parts.

Changing the number of first signal inner electrodes directly connected to the first signal terminal electrodes 1, 2 can alter the resistance value of the resistance components in the through-type multilayer capacitor array CA2. Changing the position of the first signal inner electrodes 21, 22 directly connected to the first signal terminal electrodes 1, 2 can also alter the resistance value of the resistance components in the through-type multilayer capacitor array CA2.

As in the foregoing, by adjusting one or both of the number and position of the first signal inner electrodes 21, 22 directly connected to the first signal terminal electrodes 1, 2 by the lead parts 21c, 21d, 22c, 22d, this embodiment sets the resistance value of the resistance components in the through-type multilayer capacitor array CA2 to a desirable value, and thus can control the resistance value of the resistance components easily and accurately.

Even when the number of laminations of the second signal inner electrodes 41, 42 and grounding inner electrodes 61 to 63 is increased so as to attain a greater capacitance in the capacity component in response to the demand for a larger capacity, this embodiment can keep the resistance value of the resistance components from decreasing in the through-type multilayer capacitor array CA2.

The fourth signal inner electrodes 51, 52 are not directly connected to the second signal terminal electrodes 3, 4 in the through-type multilayer capacitor array CA2. In the through-type multilayer capacitor array CA2, only the third signal inner electrodes 31, 32 are directly connected to the second signal terminal electrodes 3, 4, while the fourth signal inner electrodes 51, 52 are indirectly connected to the second signal terminal electrodes 3, 4 through the second outer connecting conductor 8 and third signal inner electrodes 31, 32. These make the resistance value of the resistance components greater in the through-type multilayer capacitor array CA2 than in a through-type multilayer capacitor array having a structure in which all of the third and fourth signal inner electrodes 31, 32, 51, 52 are directly connected to the second signal terminal electrodes 3, 4 by the lead parts.

Changing the number of second signal inner electrodes directly connected to the second signal terminal electrodes 3, 4 can alter the resistance value of the resistance components in the through-type multilayer capacitor array CA2. Changing the position of the third signal inner electrodes 31, 32 directly connected to the second signal terminal electrodes 3, 4 can also alter the resistance value of the resistance components.

As in the foregoing, by adjusting one or both of the number and position of the third signal inner electrodes 31, 32 directly connected to the second signal terminal electrodes 3, 4 by the lead parts 31c, 31d, 32c, 32d, this embodiment sets the resistance value of the resistance components in the through-type multilayer capacitor array CA2 to a desirable value, and thus can control the resistance value of the resistance components easily and accurately.

Even when the number of laminations of the second signal inner electrodes 51, 52 and grounding inner electrodes 61 to 63 is increased so as to attain a greater capacitance in the capacity component in response to the demand for a larger capacity, this embodiment can keep the resistance value of the resistance components from decreasing in the through-type multilayer capacitor array CA2.

Thus, the resistance value of the resistance components included in the through-type multilayer capacitor array CA2 in accordance with this embodiment can be controlled easily and accurately.

In this embodiment, the first signal terminal electrodes 1, 2 are arranged one by one on the opposing first and second side faces B1c, B1d of the capacitor body B1 such as to oppose each other in the opposing direction of the first and second side faces B1c, B1d. The second signal terminal electrodes 3, 4 are arranged one by one on the opposing first and second side faces B1c, B1d of the capacitor body B1 such as to oppose each other in the opposing direction of the first and second side faces B1c, B1d. The grounding terminal electrodes 5, 6 are arranged one by one on the opposing first and second end faces B1a, B1b of the capacitor body B1 such as to oppose each other in the opposing direction of the first and second end faces B1a, B1b.

For example, this makes it easy to connect the first signal terminal electrodes 1, 2 to linear signal leads, the second signal terminal electrodes 3, 4 to linear signal leads, and the grounding terminal electrodes 5, 6 to linear grounding leads, whereby the through-type multilayer capacitor array CA2 can be mounted easily.

In the through-type multilayer capacitor array CA2, the first and third signal inner electrodes 21, 31 are arranged at the same position in the laminating direction within the capacitor body B1, the first and third signal inner electrodes 22, 32 are arranged at the same position in the laminating direction within the capacitor body B1, the second and fourth signal inner electrodes 41, 51 are arranged at the same position in the laminating direction within the capacitor body B1, and the second and fourth signal inner electrodes 42, 52 are arranged at the same position in the laminating direction within the capacitor body B1. Therefore, currents can flow opposite from each other through the respective inner electrodes arranged at the same position in the laminating direction.

As a result, magnetic fields caused by the currents flowing through these signal inner electrodes cancel each other out in the through-type multilayer capacitor array CA2 in accordance with this embodiment, whereby the equivalent series inductance can be lowered.

Since the respective pairs of first and third signal inner electrodes 21, 31; 22, 32 and second and fourth grounding inner electrodes 41, 51; 42, 52 are arranged at the same positions in the laminating direction within the capacitor body B1, the through-type multilayer capacitor array CA2 allows the device to lower its profile.

Though preferred embodiments of the present invention are explained in detail in the foregoing, the present invention is not restricted to the above-mentioned embodiments and modified example. For example, the number of first signal terminal electrodes connected to the first signal inner electrodes 21, 22 is not limited to those illustrated in the above-mentioned embodiments and modified example but may be 3 or more, for example. The number of second signal terminal electrodes connected to the third signal inner electrodes 31, 32 is not limited to those illustrated in the above-mentioned embodiments and modified example but may be 3 or more, for example. The number of grounding terminal electrodes connected to the grounding inner electrodes 61 to 63 is not limited to those illustrated in the above-mentioned embodiments and modified example but may be 3 or more, for example. The number of first outer connecting conductors is not limited to those illustrated in the above-mentioned embodiments and modified example but may be 2 or more, for example. The number of second outer connecting conductors is not limited to those illustrated in the above-mentioned embodiments and modified example but may be 2 or more, for example.

The first and second signal terminal electrodes 1 to 4, grounding terminal electrodes 5, 6, and first and second outer connecting conductors 7, 8 are not required to be arranged as described in the above-mentioned embodiments and modified examples as long as they are placed on outer surfaces of the capacitor body. For example, it is not necessary for the first signal terminal electrodes to oppose each other in the opposing direction of the first and second side faces in the capacitor body. For example, it is not necessary for the second signal terminal electrodes to oppose each other in the opposing direction of the first and second side faces in the capacitor body. For example, it is not necessary for the grounding terminal electrodes to oppose each other in the opposing direction of the first and second side faces or the opposing direction of the first and second end faces in the capacitor body. For example, it is not necessary for the first and second outer connecting conductors to oppose each other in the opposing direction of the first and second side faces or the opposing direction of the first and second end faces in the capacitor body.

The number of laminations of insulator layers 11 to 18 and the number of laminations of first to fourth signal inner electrodes 21, 22, 31, 32, 41, 42 and grounding inner electrodes 61 to 63 are not limited to those illustrated in the above-mentioned embodiments and modified example. The forms of the first to forth signal inner electrodes 21, 22, 31, 32, 41, 42 and grounding inner electrodes 61 to 63 are not limited to those described in the above-mentioned embodiments and modified example.

The positions of the first signal inner electrodes 21, 22 in the laminating direction are not limited to those illustrated in the above-mentioned embodiments and modified example. The positions of the third signal inner electrodes 31, 32 in the laminating direction are not limited to those described in the above-mentioned embodiments and modified example.

For example, any of a plurality of grounding inner electrodes may be arranged such as to oppose the first signal inner electrode with at least one of a plurality of insulator layers in between, and oppose the third signal inner electrode with at least one of a plurality of insulator layers in between. In this case, the insulator layer positioned between the grounding inner electrode and first signal inner electrode may be either identical to or different from that positioned between the grounding inner electrode and third signal inner electrode.

For example, any of a plurality of grounding inner electrodes may be arranged such as to oppose the first signal inner electrode with at least one of a plurality of insulator layers in between, and oppose the fourth signal inner electrode with at least one of a plurality of insulator layers in between. In this case, the insulator layer positioned between the grounding inner electrode and first signal inner electrode may be either identical to or different from that positioned between the grounding inner electrode and fourth signal inner electrode.

For example, any of a plurality of grounding inner electrodes may be arranged such as to oppose the second signal inner electrode with at least one of a plurality of insulator layers in between, and oppose the third signal inner electrode with at least one of a plurality of insulator layers in between. In this case, the insulator layer positioned between the grounding inner electrode and second signal inner electrode may be either identical to or different from that positioned between the grounding inner electrode and third signal inner electrode.

For example, any of a plurality of grounding inner electrodes may be arranged such as to oppose the second signal inner electrode with at least one of a plurality of insulator layers in between, and oppose the fourth signal inner electrode with at least one of a plurality of insulator layers in between. In this case, the insulator layer positioned between the grounding inner electrode and second signal inner electrode may be either identical to or different from that positioned between the grounding inner electrode and fourth signal inner electrode.

The number of insulator layers held between the grounding inner electrodes 61 to 63 and their opposing first or second signal inner electrodes is not limited to the numbers described in the above-mentioned embodiments and modified example, but must be at least 1 and may be 2 or more, for example. The number of insulator layers held between the grounding inner electrodes 61 to 63 and their opposing third or fourth signal inner electrodes is not limited to the numbers described in the above-mentioned embodiments and modified example, but must be at least 1 and may be 2 or more, for example.

The respective pairs of first and third signal inner electrodes 21, 31; 22, 32 are not required to be arranged at the same position but may be located at different positions in the laminating direction within the capacitor body B1. The respective pairs of second and fourth signal inner electrodes 41, 51; 42, 52 are not required to be arranged at the same position but may be located at different positions in the laminating direction within the capacitor body B1.

In the capacitor body of the multilayer capacitor array in accordance with the present invention, insulator layers may be laminated additionally or alternately with the inner electrodes.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims

What is claimed is:

1. A through-type multilayer capacitor array comprising:
a capacitor body;
at least two first signal terminal electrodes arranged on an outer surface of the capacitor body;
at least two second signal terminal electrodes arranged on the outer surface of the capacitor body;
at least two grounding terminal electrodes arranged on the outer surface of the capacitor body;
at least one first outer connecting conductor arranged on the outer surface of the capacitor body; and
at least one second outer connecting conductor arranged on the outer surface of the capacitor body;
wherein the capacitor body includes a plurality of laminated insulator layers, a grounding inner electrode, a first signal inner electrode, a second signal inner electrode, a third signal inner electrode, and a fourth signal inner electrode;
wherein the grounding inner electrode is arranged such as to oppose the first or second signal inner electrode with at least one of the plurality of insulator layers in between and oppose the third or fourth signal inner electrode with at least one of the plurality of insulator layers in between;
wherein the grounding inner electrode is connected to the at least two grounding terminal electrodes;
wherein the first signal inner electrode is connected to the at least two first signal terminal electrodes and the at least one first outer connecting conductor;
wherein the second signal inner electrode is connected to the at least one first outer connecting conductor;
wherein the third signal inner electrode is connected to the at least two second signal terminal electrodes and the at least one second outer connecting conductor; and
wherein the fourth signal inner electrode is connected to the at least one second outer connecting conductor.

2. A through-type multilayer capacitor array according to claim 1, wherein the at least two first signal terminal electrodes are arranged at least one by one on a pair of opposing side faces of the capacitor body;
wherein the at least two second signal terminal electrodes are arranged at least one by one on the pair of opposing side faces of the capacitor body; and
wherein the at least two grounding signal terminal electrodes are arranged at least one by one on a pair of opposing side faces of the capacitor body.

3. A through-type multilayer capacitor array according to claim 1, wherein the first and third signal inner electrodes are arranged at the same position in the laminating direction of the insulator layers within the capacitor body;
wherein the second and fourth signal inner electrodes are arranged at the same position in the laminating direction of the insulator layers within the capacitor body.

4. A through-type multilayer capacitor array according to claim 1, wherein both or one of the first and third signal inner electrodes has a meander form.

* * * * *